Oct. 13, 1942.　　　　　G. FASSIN　　　　2,298,787
CAMERA
Filed Dec. 6, 1939　　　2 Sheets-Sheet 1
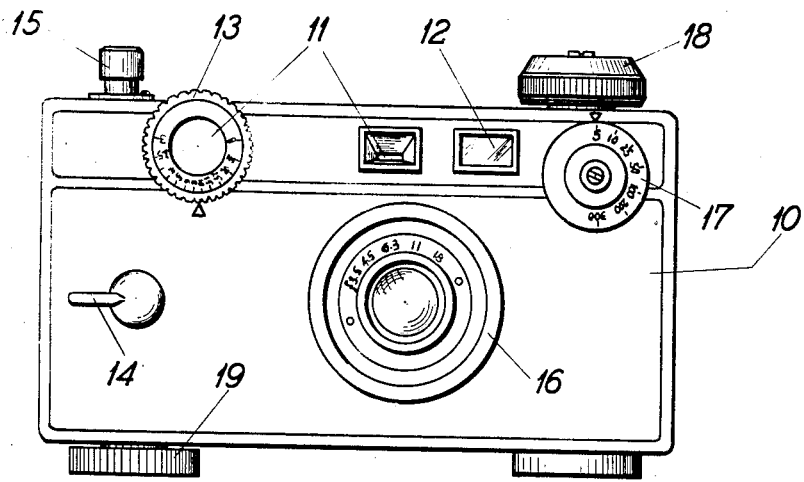
Fig. 1
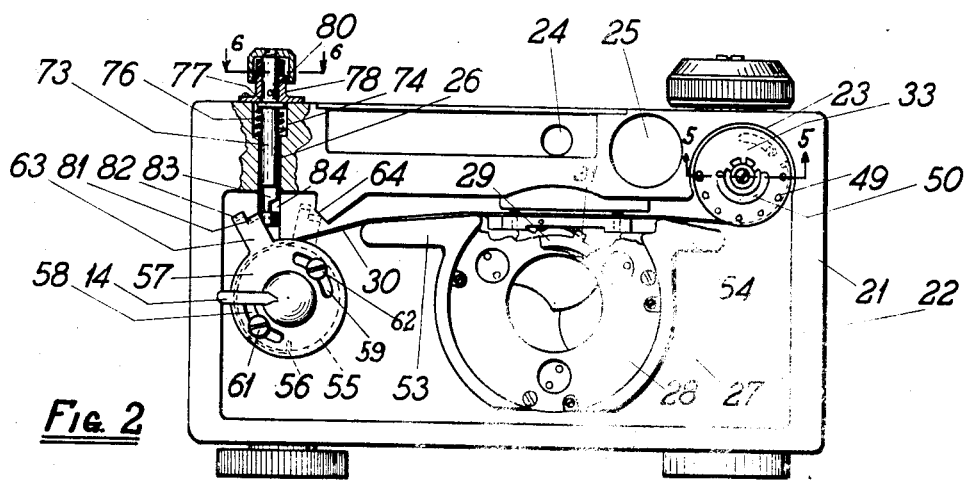
Fig. 2
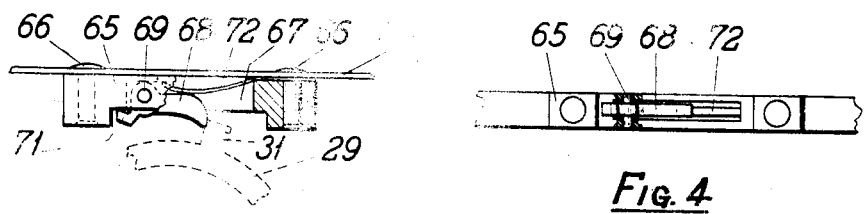
Fig. 3
Fig. 4
GUSTAVE FASSIN
INVENTOR
BY *[signature]*
ATTORNEY Oct. 13, 1942. G. FASSIN 2,298,787
CAMERA
Filed Dec. 6, 1939 2 Sheets-Sheet 2
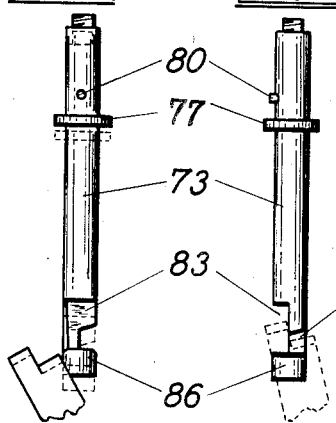
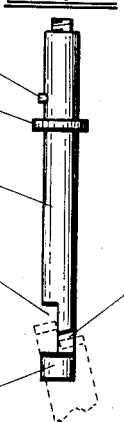
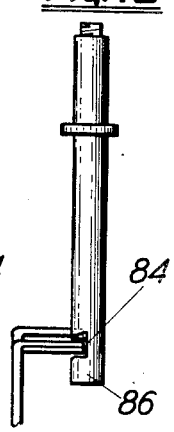
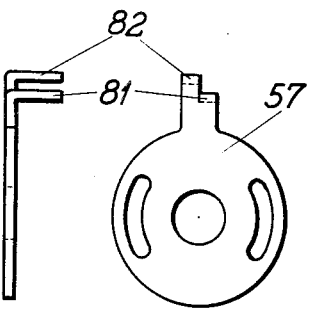
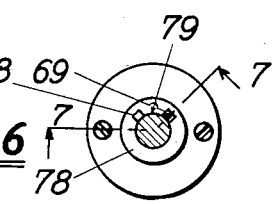
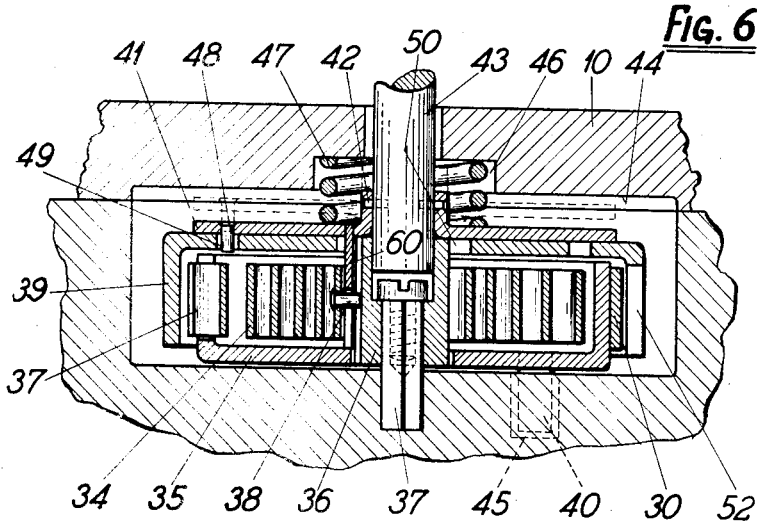
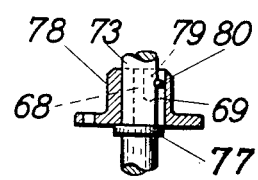
GUSTAVE FASSIN
INVENTOR
BY
ATTORNEY Patented Oct. 13, 1942

2,298,787

UNITED STATES PATENT OFFICE 2,298,787

CAMERA

Gustave Fassin, Grosse Pointe, Mich., assignor to International Industries, Inc., Ann Arbor, Mich., a corporation of Michigan Application December 6, 1939, Serial No. 307,891

17 Claims. (Cl. 95—62)

This invention relates to photographic cameras and particularly to those of the miniature type with which small sized films of the order of 35 mm. in width are used.

Cameras of the above character have many advantages over the larger and more cumbersome sizes in that they are compact and easily carried. However, as cameras of this type have been developed, many features have been added and refinements made until the relative positioning of the various parts within the camera housing has become important and changes in the construction and design of certain parts are desirable.

An object of the present invention resides in the provision of improved actuating means for the shutters of cameras.

Another object of the invention is to provide cooperating means for setting and releasing the shutter operating mechanism of cameras.

A further object of the invention is obtained by the provision of cooperating means for setting the shutter actuating mechanism and subsequently releasing the mechanism to effect either a wide open position of the shutter blades and subsequent manually controlled closure thereof or to effect a complete, automatic opening and closing thereof on the tripping stroke.

Another object of the invention is the provision of improved means for actuating camera shutters at various predetermined speeds.

Another object is to provide in association with actuating mechanism for the shutters of cameras, manually controlled means for varying the speed at which the shutter blades are opened and closed.

A still further object of the invention is the provision, in a camera, of means directly associated with a shutter release pin and a setting member for controlling the shutter actuating mechanism to obtain the type of exposure desired.

Another object of the invention resides in a novel arrangement and the relative relationship of the various parts within the camera casing.

Other objects and advantages of the invention will become apparent from a reading of the following description taken in connection with the accompanying drawings, in which;

Fig. 1 is a front elevational view of a miniature type camera embodying the various features of the present invention.

Fig. 2 is a similar view with the camera cover and lens removed.

Fig. 3 is an enlarged fragmentary view of the shutter tripping mechanism shown in Fig. 2.

Fig. 4 is a bottom plan view of the tripping mechanism shown in Fig. 3.

Fig. 5 is an enlarged sectional view of the spring controlled drum for causing actuation of the shutter mechanism and taken substantially along the line 5—5 of Fig. 2 in the direction indicated.

Fig. 6 is a top plan view of the shutter release pin shown in Fig. 2 with the cap and resilient bushing removed and taken substantially along the line 6—6 of Fig. 2.

Fig. 7 is a fragmentary sectional view taken substantially on the line 7—7 of Fig. 6.

Fig. 8 is a front elevational view of the setting member shown in Fig. 2.

Fig. 9 is a side elevational view of the setting member shown in Fig. 8.

Fig. 10 is a fragmentary elevational view showing a portion of the shutter release pin in one optional position to cooperate with the setting member stop as shown in Fig. 2.

Fig. 11 is a view similar to that of Fig. 10 but showing the release pin and setting member in another position of adjustment, and;

Fig. 12 is a fragmentary side elevational view of the setting member stops in cooperative relationship with the shutter release pin.

Referring now to the drawings, in Fig. 1 thereof a camera of the miniature type is disclosed having a casing, a cover plate 10 suitably secured thereto and having range finder openings 11 and 12, a manually operable range finder 13, a setting or priming lever 14, a shutter release pin 15, an extensible lens unit 16, a manual knob 17 connected to adjust the shutter actuating mechanism and control the speed thereof, a take-up winding piece 18, and a winding member 19 for the supply film chamber.

In Fig. 2, reference numeral 21 indicates the camera casing which may be preferably of moldable material formed to provide an interior compartment 22 separated from the spool chamber, a circular drum chamber 23, range finder opening 24 and view finder opening 25, and an opening 26, leading from the top of the casing to the interior compartment 22. In the present instance the shutter housing 27 may be molded within the casing to project outwardly therefrom and formed substantially circularly to receive the mechanism of a suitable and well known blade type shutter 28 and a shutter operating ring 29 having a return spring associated therewith and a projection 31 thereon to be engaged by the shutter actuating mechanism.

The shutter actuating mechanism comprises a drum, indicated generally in Fig. 2 at 33 and specifically in Fig. 5 at 35. This drum is preferably positioned adjacent one end of the casing 21 and is rotatably mounted upon a bushing 36 which, in turn, is non-rotatably mounted upon a square pin 37 carried by the casing 21. A small flat coil spring 34 may be positioned in the drum 35 and secured at its outer end to the periphery of the drum as at 37, its inner end being provided with a pin or projection 38. The drum further comprises a fixed cover plate 39 rigidly secured to the bushing 36, and an adjusting disc 41 overlies the top of the cover plate 39 and is movable relatively thereto. This disc is rigidly secured as at 42 to a rotatable and reciprocable shaft 43 which, in turn, is connected to the speed adjustment knob 17. The knob 17, shaft 43 and adjusting disc 41 are adapted to be reciprocated between the top of the drum cover plate 39 and the inner surface 44 of the camera cover plate 10 and the cover plate may accordingly be provided with an enlarged portion 46 to receive a coiled compression spring 47 positioned around the shaft 43 between the camera cover 10 and the top of the adjusting disc 41 to urge these parts to the position shown in Fig. 5.

The disc 41 may be provided with a downwardly extending projection 48 adapted to selectively engage one of a series of openings 49 in the drum cover plate 39 to tension the spring 34 to any desired extent for controlling the speed of shutter actuation. For directly increasing or decreasing the tension of the spring, the adjusting disc 41 is provided with a downwardly projecting forked member 60 extending through an arcuate slot 50 in the cover 39 and adapted to cooperate with the pin 38 on the inner end of the coil spring 34. Thus, outward movement of the speed adjustment knob 17 and the shaft 43 against the compression of the spring 47 will disengage the projection 48 from its associated opening 49, and a simultaneous rotative movement of the knob 17 will move the pin 48 on the adjusting disc 41 to any desired speed adjustment, as visibly indicated on the knob 17, whereby upon manual release, the knob 17 and shaft 43, together with the adjusting disc 41, will be urged toward the drum cover plate 39 by the compression spring 47 and the projection 48 will engage the pre-selected opening 49, thus tensioning the spring to any desired extent.

A flat carrier band 30 of relatively light flexible material, may be secured to the outer periphery of the drum 35 in any desired manner, passing partially around the lower side of the drum 35 through a cut out portion 52 in the drum cover 39, transversely within the interior 22 of the camera casing over guides 53 and 54 and may be connected at the opposite side of the casing 22 from the drum 35 to a setting drum 55 rotatably carried in any suitable manner by the casing 21. The flat band 30 may be secured at this end to the outer periphery of the drum 55 as at 56.

The setting drum may be provided with an adjustable setting member 57 having arcuate slots 58 and 59 formed therein to receive adjusting screws 61 and 62 carried by the setting drum 55. Thus, precise relative adjustment may be made by the setting member and its carrier drum. The setting member 57 may also be formed with a radially extending stop 63, and a projection 64 may be integrally formed on the casing 21 to extend into the compartment 22 in a position to form an abutting surface for the stop 63 when rotated in a clockwise direction.

Thus, with the spring tensioned drum 35 adjusted for any desired shutter speed, rotation of the setting drum 55 counterclockwise will pull the carrier band 30 transversely of the casing across the guides 53 and 54, unwinding it from the tensioning drum, and upon release of the setting member, the tensioning drum will automatically draw the carrier band 30 back across the guides 53 and 54 rotating the setting drum and setting member 57 clockwise until the stop 63 abuts the casing projection 64. The scope of movement permitted the tensioning drum 35 may be controlled by a pin 43 on the bottom of the drum 35 moving in an arcuate slot 45 provided in the camera casing 21.

For tripping the shutter blades 28 to cause the opening and closing thereof, a small bracket 65 may be riveted or otherwise secured as at 66 to the underside of the carrier band 30 within the shutter unit and provided with an opening 67 to receive a pawl 68 which may be pivoted as at 69 and, in turn, provided with a stop 71 to limit its downward movement. The pawl 68 may be urged to its downwardly extending or tripping position by means of a small spring 72 carried by one of the rivets 66. As the carrier band 30 moves transversely to the right in Figs. 2, 3 and 4, the pawl 68 being urged to its tripping position by the spring 72, will engage the projection 31 on the shutter operating ring 29, rotating it clockwise until the projection 31 passes out of the path of the pawl 68 whence the shutter ring 29 will automatically return to its closed position by a counter-clockwise movement in the well known manner. As the carrier band 30 is manually moved to the left or priming position in Fig. 2 by the priming lever 14, the under face of the pawl 68 will ride over the projection 31 permitting the tripping mechanism to assume a cocked position without causing the opening of the shutter blades.

In accordance with the invention, features are incorporated in the shutter reelase mechanism whereby the shutter blades may be quickly opened and closed for instantaneous exposures or may be moved to wide open position, held, and subsequently released for obtaining time exposures. This mechanism comprises a vertical manually operable release pin 73 extending from the top of the casing, through the opening 26 therein to the interior compartment 22 where it terminates in the path of movement of the stop 63 of the setting member 57. The opening 26 may be slightly enlarged adjacent its upper end as at 74 to receive a small compression spring 76 positioned around the release pin 73 and bearing against a shoulder 77 formed thereon which, in turn, may be retained in place against the action of the spring 76 by a sleeve 78 suitably secured to the exterior of the casing. With reference to Figs. 6 and 7, the sleeve 78 may be provided with a pair of angularly positioned slots, 68 and 69, formed on the inner wall thereof and extending vertically from top to bottom thereof to receive a small radial pin 89 on the release pin 73. From a short distance below the top of the sleeve 78 the material forming the sleeve is cut out between the slots 68 and 69 forming a projection 79 positioned between the slots so that by depressing and rotating the release pin 73 against the action of the spring 76, the pin 80 may be moved to engage another slot and thus change the angular position of the release pin 73 with relation to the setting member stop 63.

The projection or stop 63 on the setting member 57 is divided adjacent its outer end providing an angularly extending stop 81 and another similar and parallel stop 82 at a slightly greater distance from the axis of the setting member 57. Adjacent its lower or inner end but spaced therefrom, the release pin 73 is provided with a transverse slot 83 of sufficient width to permit both stops 81 and 82 to pass therethrough. At right angles to the slot 83, a similar slot 84 is formed in the release pin and is approximately half the width of the slot 83 or only sufficient to permit the shorter stop 81 to pass therethrough, the longer stop 82 being held from further movement by the face of the slot 83. The extreme lower end 86 of the release pin 73 forms a shoulder preventing the movement of the stop 81 in a clockwise direction when the release pin is in normal or cocked position as shown in Fig. 2, but its edge is slightly rounded to permit the shorter stop 81 to ride thereover on its return or priming stroke whereupon the release pin 73 is slightly depressed but resumes its normal position when the stops 81 and 82 are in position.

Thus, it will be seen that when the release pin 73 is adjusted and locked in the position shown in Fig. 2, the wider slot 83 is presented. Upon manual depression of the release pin it will move downwardly to the position shown in dotted lines in Fig. 10 permitting both stops 81 and 82 to pass therethrough releasing the carrier band 30 to move transversely to the right, causing the pawl 68 to trip the shutter mechanism. After the stop 63 has passed the release pin 73, the compression of the spring 76 will force the pin upwardly. Upon manually rotating the setting member 57 counter-clockwise to priming position, the stop 81 will ride over the rounded cam surface 86 at the lower end of the release pin 73 drawing the pin downwardly sufficiently to permit both stops to pass through the slot 83 whereupon the release pin will again resume its cocked position.

To obtain a time exposure, wherein the shutter blades are first opened, held and then released, the release pin 73 may be manually rotated a quarter turn to present only the smaller slot 84, whereupon a depression of the release pin 73 will permit only the shorter stop 81 to pass the release pin 73, the longer stop 82 being held by the face of the slot 83. At this moment, the shutter blades are wide open and when sufficient exposure has been obtained, manual release of the release pin 73 will permit it to assume its normal position and as it moves upwardly the second or longer stop 82 may pass through the slot 84 permitting the shutter blades to be closed.

It will thus be seen that the present invention provides an efficient and economical arrangement of parts within a small camera casing and provides many economical improvements in construction and design of the various parts.

It will be obvious to those skilled in the art that various modifications in construction and design may be made without departing from the spirit or scope of the invention which is to be limited only by the appended claims.

I claim:

1. In a camera having a casing, a shutter, a shutter operating member, a drum rotatably mounted in said casing on one side of said shutter operating member, yieldable means urging said drum in one direction of its rotation, a setting drum on the opposite side of said shutter operating member, a movable connecting member between said drums carrying a tripping member to engage said shutter operating member when said connecting member is moved, and manually operable means to move said setting drum in one direction of its rotation to thereby move said shutter tripping member to one position of adjustment, said yieldable means operating to rewind said first drum when said setting drum is released and thereby to move said tripping member to engage said shutter operating member to cause an opening and closing of said shutter.

2. In a camera having a casing and a shutter, means for actuating said shutter comprising a pair of drums rotatably mounted in said casing and positioned one on either side of said shutter, a connecting member between said drums adapted to be partially wound on either drum and carrying a shutter tripping member, a spring associated with one of said drums for urging it in one direction of its rotation, manual means connected to rotate the other of said drums to cause movement of said connecting member and tripping member to cocked position, whereby upon release of said setting member, said connecting member and said tripping member will be moved under the action of said spring to actuate said shutter mechanism.

3. In a camera having a casing and a shutter, means for actuating said shutter comprising a pair of drums rotatably mounted in said casing and positioned one on either side of said shutter, a connecting member between said drums adapted to be partially wound on either drum and carrying a shutter tripping member, a spring associated with one of said drums for urging it in one direction of its rotation, manually operable means connected to vary the tension of said spring, manual means connected to rotate the other of said drums to cause movement of said connecting member and tripping member to cocked position, whereby upon release of said setting member, said connecting member and said tripping member will be moved under the action of said spring to actuate said shutter mechanism.

4. In a camera having a shutter and actuating mechanism therefor, a rotatable setting member having a pair of stops extending radially therefrom, said stops being of different lengths and parallel to each other, a manually rotatable and depressible release pin extending into the path of movement of said stops and having a pair of angularly related cut away portions, of different widths, one being of sufficient width to pass only one of said stops and the other being of sufficient width to pass both of said stops, whereby either one or both of said stops may pass therethrough when said release pin is rotatably adjusted and manually depressed.

5. In a camera having a shutter and actuating mechanism therefor, a rotatable setting member having a pair of stops extending radially from said setting member, said stops being of slightly different lengths, a manually operable release pin extending into the path of movement of said stops and including resilient means associated therewith and connected to urge said release pin toward one position, a pair of angularly related slots in said release pin, one wide enough to pass only one of said stops and the other being wide enough to pass both of said stops, and means controlling the position of said slots relative to said stops whereby first one stop may pass through one of said slots upon a depression of the release pin and the other of said stops will be held thereby, and upon manual release, said release pin may assume its normal position permitting the other of said stops to pass through said slot.

6. In a camera having a shutter, an operating mechanism for said shutter, a spring motor connected to said mechanism for causing said mechanism to operate said shutter, a cocking member connected to said operating mechanism, a stop on said cocking member, a movable release member, means on said release member for cooperating with said stop to retain the cocking member and operating mechanism in cocked position, and means for releasing said stop upon movement of said release member.

7. In a camera having a shutter, an operating mechanism for said shutter, a spring motor connected to said mechanism for causing said mechanism to operate said shutter, a cocking member connected to said operating mechanism, a stop on said cocking member, a manually depressible release pin extending into the path of movement of said cocking member and having a cut away portion to permit the passage of said stop past said release pin when said release pin is manually depressed.

8. In a camera, a casing, a shutter cocking member carried by said casing comprising a rockably mounted member and a setting member angularly adjustable on said rockable member, a manually operable shutter release device on said casing and cooperating stop formations on said setting member and said device.

9. In a camera, a casing, a shutter cocking member carried by said casing comprising a rockably mounted drum and a setting member angularly adjustable on said drum, a radially projecting stop formation on said setting member, a manually operable shutter release pin reciprocably mounted on said casing and a stop formation on said pin within the casing cooperating with said stop formation on the setting member for releasably holding the latter in cocked position.

10. In a camera, a casing carrying a shutter, power means in said casing for actuating said shutter, a rockable shutter cocking member in said casing, a manual control member on said camera accessible externally of the camera for selectively setting said cocking member, a shutter operating member extending between said power means and said cocking member, and means on an intermediate portion of said shutter operating member adapted to be operatively connected to said shutter.

11. In a camera, a casing, a spring motor and a rockable shutter cocking member mounted in spaced relation on said casing, a manual control member on said camera accessible externally of the camera for selectively setting said cocking member, a shutter within said casing, a flexible strap connected at opposite ends to said motor and cocking member, and means on said strap for actuating said shutter when moved in a selected direction by said motor.

12. In the camera defined in claim 11, said last-named means comprising a resilient one-way clutching device between said strap and the shutter.

13. In a camera, a casing wherein a spring motor, a shutter cocking member and a shutter are mounted in spaced relation, a manual control member on said camera accessible externally of the camera for selectively setting said cocking member, a manually operable shutter release device on said casing for holding said cocking member in shutter cocking position against the action of said motor, and means for selectively adjusting and presetting the force with which the motor tends to urge said cocking member away from shutter cocking position, said last-named means effecting control of the exposure time.

14. In a camera having a shutter, a movably mounted member adapted to operate said shutter, power means connected to said member, a rockably mounted shutter cocking member distinct from said power means, a manual control member on said camera accessible externally of said camera for selectively setting said cocking member, said shutter cocking member being rockable to shutter cocking position against the action of said power means, a manually operable shutter release device and cooperating stop formations on said device and shutter cocking member for releasably holding said shutter cocking member in cocked position.

15. In a camera, a rockable shutter cocking member and a spring motor arranged in spaced relation, a manual control member on said camera accessible externally of the camera for selectively setting said cocking member, said cocking member and motor each having a movable arcuate face, a flexible shutter operating member extending between said motor and shutter cocking member with its opposite ends wound upon substantial portions of said arcuate faces and being affixed securely thereto.

16. In a camera, a casing, a shiftable shutter cocking member on said casing, a manual control member on said camera accessible externally of the camera for selectively setting said cocking member, a manually operable shutter release device movably mounted on said casing, power means within said casing, cooperating means on said cocking member and release device for holding the cocking member in cocking position against the action of said power means and a stop on said casing limiting rocking of said cocking member following release by said device.

17. In the camera defined in claim 16, said cocking member having a radial projection for cooperating with said device, and said stop comprising an integral abutment on said casing.

GUSTAVE FASSIN.